United States Patent [19]
Asakawa et al.

[11] Patent Number: 5,142,582
[45] Date of Patent: Aug. 25, 1992

[54] SPEECH CODING AND DECODING SYSTEM WITH BACKGROUND SOUND REPRODUCING FUNCTION

[75] Inventors: Yoshiaki Asakawa, Kawasaki; Toshiyuki Aritsuka, Nara, both of Japan

[73] Assignee: Hitachi, Ltd., Tokyo, Japan

[21] Appl. No.: 511,768

[22] Filed: Apr. 20, 1990

[30] Foreign Application Priority Data

Apr. 28, 1989 [JP] Japan ................... 1-107617

[51] Int. Cl.$^5$ .............................................. G10L 5/00
[52] U.S. Cl. ........................................ 381/36; 381/51
[58] Field of Search ................... 381/29–40, 381/47; 371/38.1, 41

[56] References Cited

U.S. PATENT DOCUMENTS

| | | | |
|---|---|---|---|
| 4,301,329 | 11/1981 | Taguchi | 381/37 |
| 4,654,853 | 3/1987 | Moriyama et al. | 371/41 |
| 4,754,483 | 6/1988 | Weaver | 381/36 |
| 4,918,729 | 4/1990 | Kudoh | 381/36 |
| 4,972,484 | 11/1990 | Theile et al. | 381/37 |
| 4,979,174 | 12/1990 | Cheng et al. | 371/41 |

*Primary Examiner*—Dale M. Shaw
*Assistant Examiner*—Michelle Doerrler
*Attorney, Agent, or Firm*—Antonelli, Terry, Stout & Kraus

[57] ABSTRACT

In speech decoding, a transmission code, which includes an error correcting code added to a speech code, is received and whether or not there is a code error is detected on the basis of the error correcting code. At this time, when there is no code error or when the detected code error has been corrected, a normal speech decoding processing is executed. On the other hand, when there is a code error which is impossible to be corrected, artificially background sound corresponding to the decoded speech is generated from characteristic parameters indicating unvoiced sound in the decoded speech. The parameters are continuously extracted from the decoded speech, stored in a memory and are used to replace an erroneous portion of the speech code.

19 Claims, 3 Drawing Sheets

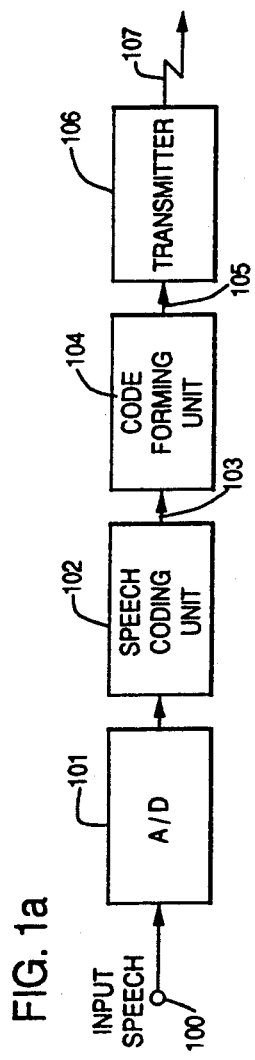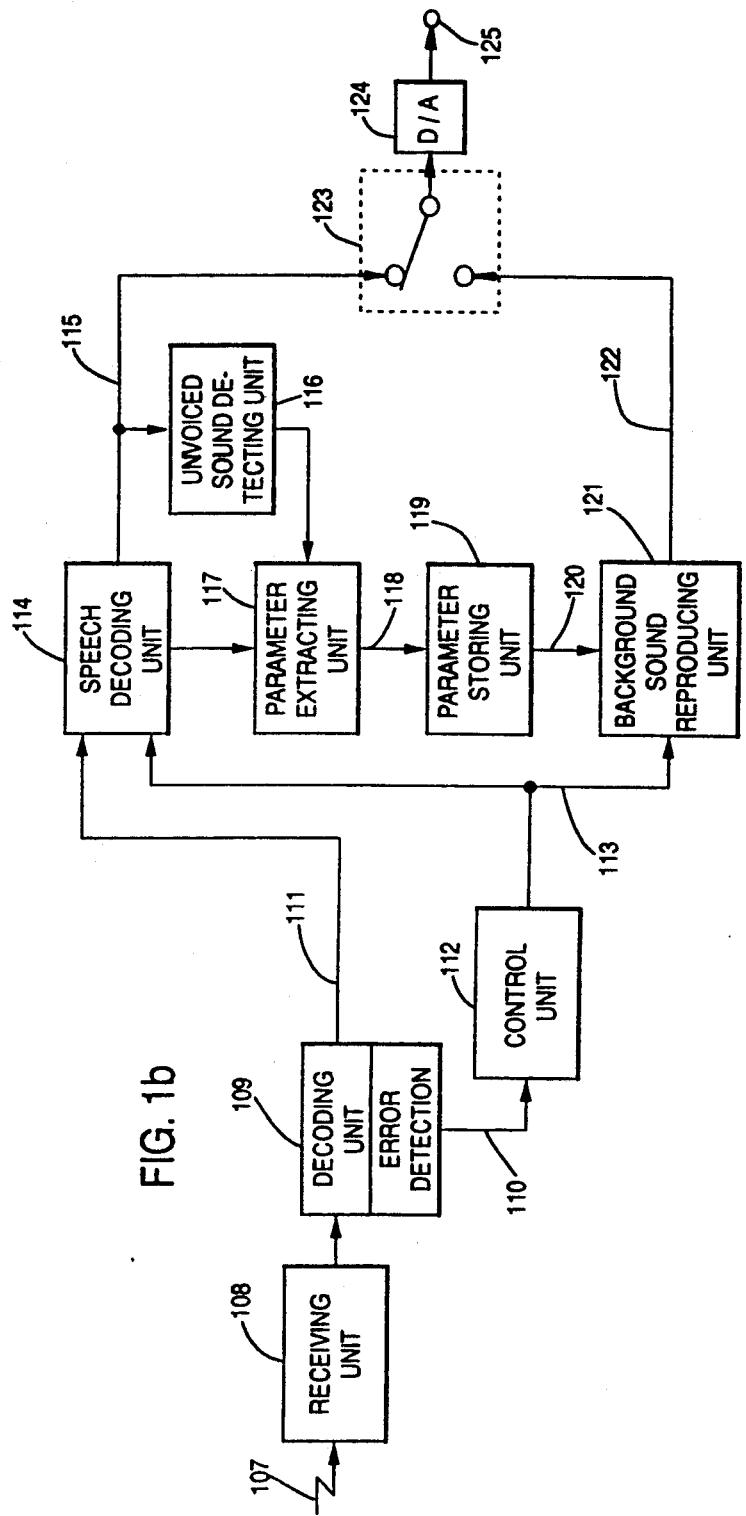
FIG. 1a
FIG. 1b

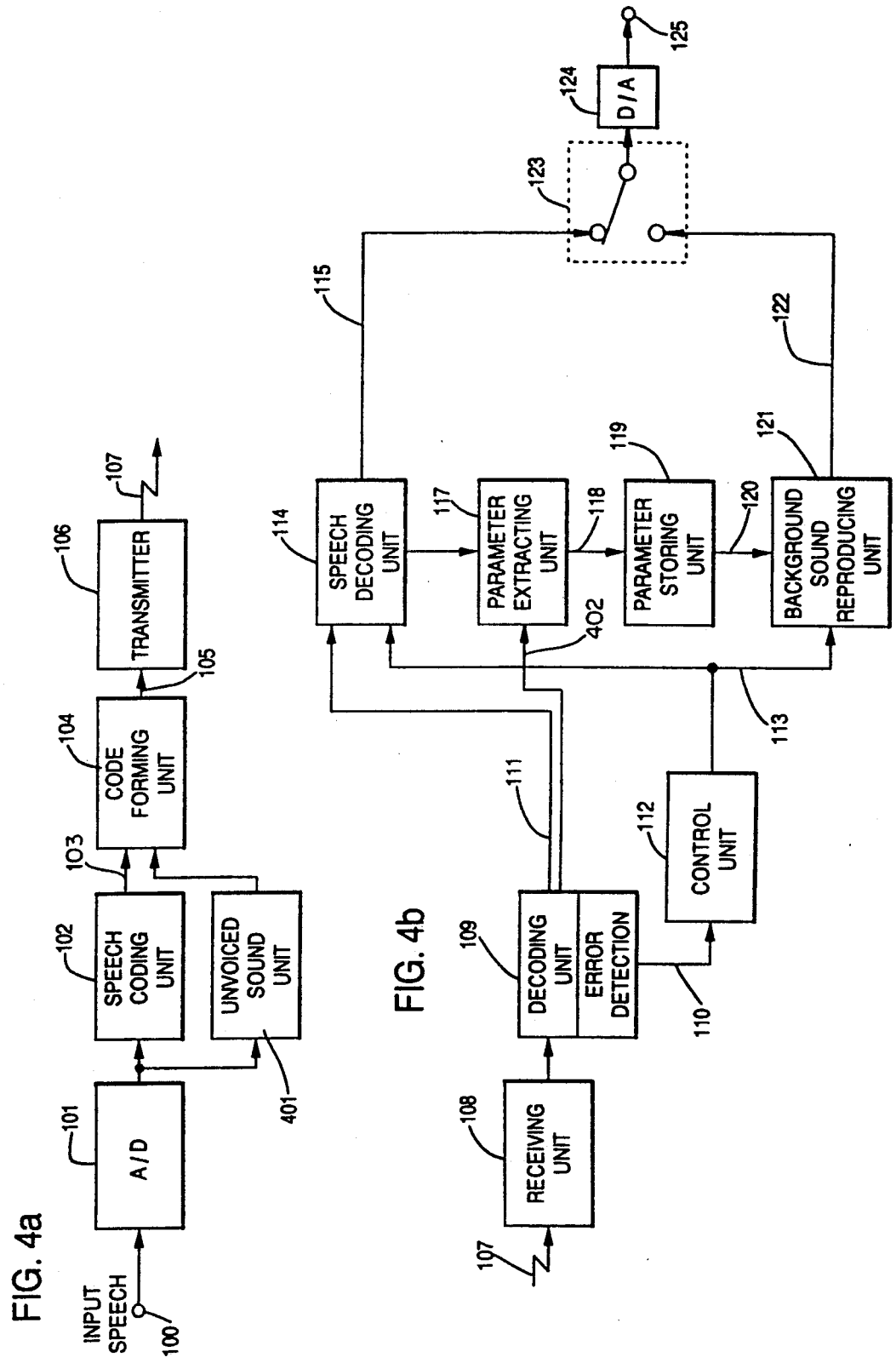

SPEECH CODING AND DECODING SYSTEM WITH BACKGROUND SOUND REPRODUCING FUNCTION

BACKGROUND OF THE INVENTION

The present invention relates in general to a speech communication system, and more particularly to a speech coding and decoding system which is suitable for a type of transmission, such as mobile radio communication, in which there may be many transmission code errors.

The present trend in mobile radio systems is characterized by a shift from the conventional analog system to an all digital system. In such a digital system, the speech signal is digitized and subjected to low bit rate coding. However, the bit rate is required to be less than or equal to 8kbps because of current restrictions on assigned frequencies for radio communications. Examples of a low bit rate speech coding method are described in U.S. application Ser. No. 015,025, filed Feb. 17, 1987, and assigned to the same assignee as the present application.

On the other hand, in communication systems which involve the use of a transmission medium of inherently low reliability, for example, mobile radio communication systems, error correcting codes are generally added to the transmitted data. Two different types of error correcting codes have been employed: one which is only capable of detecting a code error and another which has the additional ability to correct an erroneous code. Typical error correcting codes are discussed, for example, in Shu Lin/Daniel J. Costello, Jr., "Error Control Coding", Fundamentals and Applications, Prentice Hall, Inc., Englewood Cliffs, N.J. 07632 (1983).

However, codes having a high correcting capability tend to have a larger number of bits. In actual use, therefore, appropriate correcting codes are selected on the basis of a balance between the correcting capability and the number of bits of the code. As a result, if the extent of the transmission code error is excessively large, it cannot be corrected and remains uncorrected.

Hitherto, measures have often been adopted to employ codes having a high error correcting capability at the sacrifice of transmission efficiency and speech quality. In this regard, the correction of code errors has been the principal objective and no measures have heretofore been taken to cope with a situation where error correction cannot be effected. In particular, speech communication in which speech is transmitted by a low bit rate coding method involves the problem that, when a code error occurs, a queer or unpleasant sound is generated, thus causing a disturbance to the listener. One way of dealing with this problem is to output 0 or insert white noise in the erroneous part of the data when a code error cannot be corrected, with a view to preventing generation of undesirable sound affects. In such a case, however, a discontinuity in the speech quality is conspicuous and the speech becomes unnatural.

SUMMARY OF THE INVENTION

It is an object of the present invention to provide a speech coding and decoding system and method in which it is possible to effectively cope with an inability to correct a transmission code error in a coded speech transmission signal using the error correction code included therein.

It is another object of the present invention to provide a method of reproducing a background sound extracted from a coded speech transmission signal for use in compensating transmission code errors.

It is a further object of the present invention to provide a speech coding and decoding system which is designed so that, even when a code error cannot be corrected, generation of a queer or undesirable sound is prevented, and speech without any discontinuity.

In accordance with the present invention, in speech coding, an input digital speech signal is converted to a low bit rate and is sent out through a transmission medium after an error correcting code has been added thereto. In speech decoding, the transmission code formed by adding an error correcting code to the speech code is received and it is detected whether or not there is a code error on the basis of the error correcting code. At this time, when there is no code error or when the detected code error has been corrected, a normal speech decoding process is executed; however, when there is a code error which is impossible to correct, an artificial background sound corresponding to the decoded speech is generated by using characteristic parameters indicating unvoiced sound in the decoded speech. The parameters of the unvoiced speech are extracted from the decoded speech and stored in a memory, and the stored parameters are updated by new ones constantly, so that the most recent unvoiced sound in the decoded speech can be inserted in place of the erroneous code portion as an artificial background sound.

In speech communication, speech actually occurs only about 40% of the time, and during the rest of the time, background sounds are transmitted. To generate a tone which is as close to the background sounds as possible, the present invention uses an unvoiced sound (background sound) detecting unit, a sound parameter extracting unit, a sound parameter storing unit and an artificial background sound generating unit. The present invention further has a control unit for switching from a normal speech decoding processing to an artificial background sound generating processing or vice versa according to whether or not there is a code error.

BRIEF DESCRIPTION OF THE DRAWINGS

The present invention will be understood more clearly from the following detailed description with reference to the accompanying drawings, in which:

FIG. 1a is a block diagram of a speech coding system and FIG. 1b is a block diagram of a speech decoding system according to one embodiment of the present invention;

FIGS. 4a and 4b are block diagrams of a speech coding and decoding system according to another embodiment of the present invention.

DESCRIPTION OF THE PREFERRED EMBODIMENTS

Figure 2:
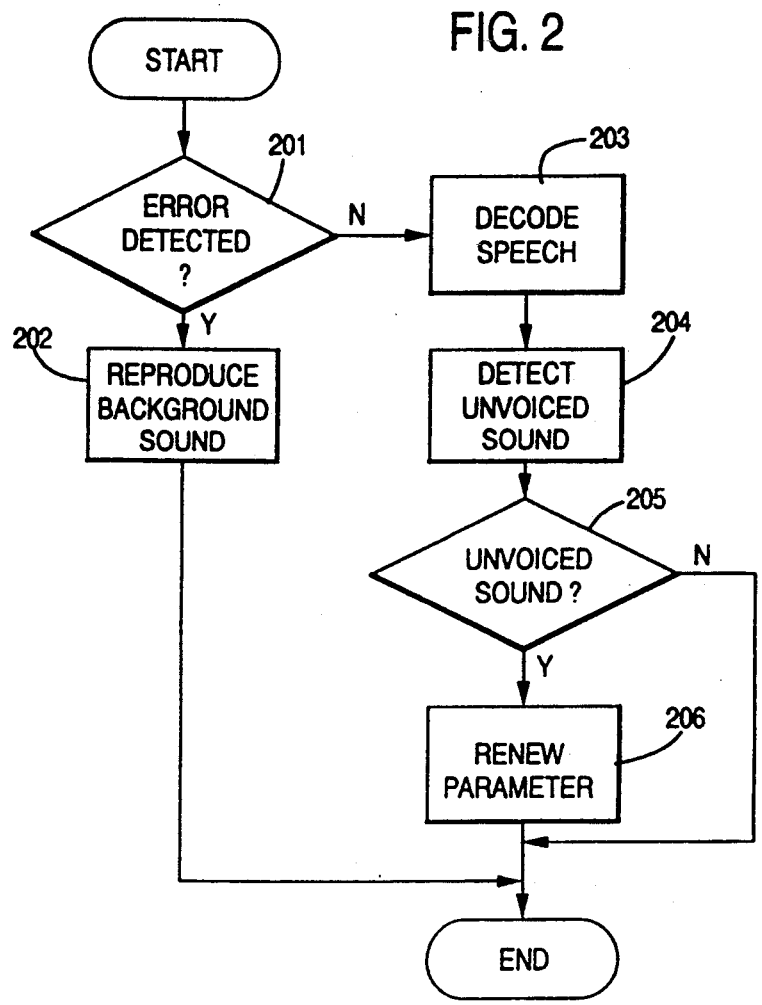
FIG. 2 is a flowchart showing the operation of the embodiment in FIG. 1.

A first embodiment of the present invention will be described below with reference to FIGS. 1a and 1b of the drawings.

In the coding section of this apparatus, as seen in FIG. 1a, an analog speech signal is inputted to an input terminal 100, digitized in an A/D converter 101 and then inputted to a speech coding unit 102. The speech coding unit 102 codes the speech at a predetermined bit rate to output a speech code signal 103. An error correcting code is added to the speech code signal in a code forming unit 104 to form a transmission code signal 105, which is then converted into a predetermined format in a transmitting unit 106 and transmitted on a transmission medium 107.

In the decoding section of this apparatus, as seen in FIG. 1b, the transmission code is received by a receiving unit 108 via the transmission medium 107. In general, when a code error occurs on the transmission medium, the code received is different from the code that is transmitted from the coding section. A decoding unit 109 detects such a code error on the basis of the error correcting code included in the transmission data. If the degree of the detected code error is so low that the code error can be corrected, the coding unit 109 corrects the erroneous code and outputs it as a speech code 111. At the same time, the decoding unit 109 outputs final information in the form of error detecting signal 110, indicating whether or not there is a code error which can be corrected.

A control unit 112 switches control on the basis of the error detecting signal 110. First of all, when there is no code error or when the detected code error has been corrected, a normal speech decoding process is executed in a speech decoding unit 114. The decoded speech 115 is applied to an unvoiced sound (background sound) detecting unit 116, where the kind of the decoded speech (whether it is voiced speech or a background sound) is judged. When the decoded speech is judged to be unvoiced sound, a parameter (e.g., a spectral parameter) 118 of the background sound is extracted in a parameter extracting unit 117, and the parameter value is stored in a parameter storing unit 119. The output in this mode is the decoded speech 115.

On the other hand, if there is a bit error, the switching control unit 112 switches the control to the artificial background sound generating mode. At this time, the most recently determined background parameter is read out from the parameter storing unit 119, and an artificial background sound is reproduced in a background sound reproducing unit 121 by using this parameter. In this mode, the output is not the decoded speech, but is the artificial background sound 122.

A switch 123 is synchronized with the control unit 112 to send either the decoded speech 115 or the artificial background sound 122 to a D/A converter 124 in accordance with the process mode, and an analog signal is outputted from an output terminal 125.

FIG. 2 shows the flow of the above-described operations. In FIG. 2, whether or not there is a code error in the received transmission code is detected on the basis of the error correcting code added to the transmission data (step 201). When there is a code error which can not be corrected, the background sound is reproduced (step 202). When there is no code error or when the detected code error has been corrected, a normal speech decoding processing is executed (step 203). Whether or not there is an unvoiced sound existing in the decoded speech is detected (step 204), and then, when decoded speech is judged to be unvoiced sound (step 205), a characteristic parameter of the unvoiced sound is extracted and renewed as the latest background sound (step 206). The parameter is used for reproducing the background sound.

The processing carried out in each block described above will be explained in more detail.

The speech coding unit 102 and the speech decoding unit 114 are based on speech coding by using a known coding method. This embodiment employs the residual compression (TOR) system by which the bit rate can be less than or equal to 8kbps. The feature of this system resides in that, among predicted residuals extracted by a linear prediction analysis, only those which are highly contributory to tone quality are employed as sound source pulses. This is called a residual thinning process, by which optimal residual thinning is effected according to whether the input speech is a voiced sound or unvoiced sound. Since we have disclosed the details of such processing, along with examples of a speech coding unit and speech decoding unit, in the prior U.S. application Ser. No. 015,025, description thereof is omitted herein.

The output of the speech coding unit 102 includes a spectral parameter, voiced/unvoiced sound information, pitch information and thinned residual information for each frame (e.g., 20ms).

The functions of the code forming unit 104 and the decoding unit 109 will be explained next. An error correcting code is redundantly added to an information source code (the speech code in this case) so that it is possible to detect and correct a code error at the receiving side. Error correcting codes vary from those which are only used to judge whether or not there is a code error, e.g., so-called parity bits, to those which are capable of correcting a code error as long as the degree of the error is lower than a predetermined level. Since specific examples are discussed, for example, in Shu Lin/Daniel J. Costello, Jr., "Error Control Coding", Fundamentals and Applications, Prentice Hall, Inc., Englewood Cliffs, N.J. 07632 (1983), description thereof is omitted herein. An error correcting code is added to the speech code for each frame. In this embodiment, the BCH code (Bose-Chaudhuri-Hocquenghem code), which is a typical error correcting code, is employed. In this case, the length of the transmission code is about double that of the speech code.

The unvoiced sound (background sound) detecting unit 116 operates on the basis of a known method, for example, the two-threshold method disclosed, e.g., in Japanese Patent Laid-Open No. 274941/1987.

The parameter extracting unit 117, when unvoiced sound is detected in the unvoiced sound detecting unit 116, extracts the spectral parameter and residual power of the frame concerned. Since in the TOR system the spectral parameter and residual information are decoded in the speech decoding unit 114, it is only necessary for the unit 117 to transfer the decoded spectral parameter and residual information to the parameter storing unit 119. In a coding system where the spectral parameter and other information are not transmitted, it is only necessary for the unit 117 to realize a function similar to the linear prediction analysis conducted in the speech coding unit 102.

Parameters which are stored in the parameter storing unit 119 are the spectral parameter and the residual power. More specifically, in the case of the TOR system, the spectral parameter is the PARCOR (partial autocorrelation) coefficient. And, in the parameter storing unit 119, a parameter is replaced by another parameter for every frame which does not include an error code and is judged as unvoiced sound.

Figure 3:
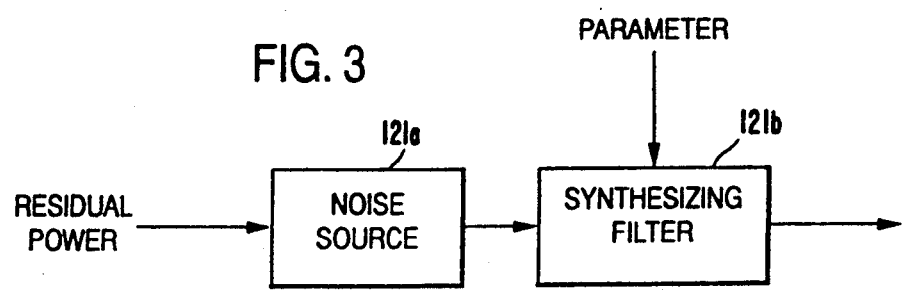
FIG. 3 is a schematic diagram showing the basic arrangement of a background sound generating unit.

The background sound reproducing unit 121, as seen in FIG. 3, is realized by inputting a noise source 121a controlled by the residual power into a synthesizing filter 121b controlled by the spectral parameter obtained from parameter storing unit 119. Although in this embodiment, the speech coding unit and the background sound reproducing unit 121 are arranged separately from each other, the background sound reproducing function also can be realized by using the synthesizing filter included in the speech decoding unit 114 under switching control, as a matter of course.

It should be noted that the unvoiced sound (background sound) detecting unit 116, as described in the embodiment of FIG. 1, may be placed in the coding section instead of being provided in the decoding section. In such a case, it is necessary to transmit the result of detection by means of a flag. FIG. 4 shows an overall block diagram of a second embodiment of the present invention which includes such a feature. In the coding section, a digitized speech signal is inputted to an unvoiced sound unit 401 and whether or not there is an unvoiced sound existing in the digitized speech signal is detected. A signal indicating the result of detection is inputted into code forming unit 104 and is transmitted in the form of a flag through transmitting unit 106. In the decoding section, when there is no code error or when the detected code error has been corrected, a parameter of unvoiced sound is extracted in parameter extracting unit 117 as a background sound in response to a signal 402 indicating the presence of unvoiced sound.

In these embodiments, error detection is executed for each frame. Therefore, the switching between the background sound generating mode and speech decoding mode is executed in each frame by control unit 112. For example, when plural frames including an uncorrected error code succeed each other, the background sound mode is maintained for these frames.

As an alternative, when the background sound in a speech signal can be expected to remain substantially constant, it is possible to preliminarily store a parameter and residual power value for that background sound in the parameter storing unit 119 and operate without the use of the unvoiced sound detecting unit 116 and parameter extracting unit 117.

While we have shown and described various embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A speech decoding apparatus for decoding a speech code signal transmitted via a transmission medium and an error correcting code for detecting and correcting code errors in said speech code signal, comprising:
    receiving means for receiving a transmission code signal including said error correcting code from said transmission medium;
    decoding means for detecting a code error corresponding to said error correcting code and for separating said speech code signal from said transmission code signal, said detecting means including means for correcting an erroneous code of said speech code signal in accordance with a predetermined rule and for generating error indicating information corresponding to said code error, said error indicating information indicating that said erroneous code cannot be corrected;
    speech decoding means for decoding said speech code signal separated from said transmission code signal in accordance with a predetermined process to generate a decoded speech signal;
    background sound generating means for generating a background sound signal corresponding to background sound corresponding to said decoded speech signal; and
    switching controlling means for controlling said speech decoding means and said background sound generating means to select said speech code signal or said background sound signal in accordance with said error indicating information.

2. A speech decoding apparatus according to claim 1, wherein said decoded speech signal includes unvoiced sound information.

3. A speech decoding apparatus according to claim 2, wherein said background sound generating means includes means for detecting said unvoiced sound information of said decoded speech signal.

4. A speech coding apparatus according to claim 2, wherein said unvoiced sound information includes a spectral parameter and a power value.

5. A speech coding apparatus according to claim 4, wherein said background sound generating means includes a synthesizing filter controlled by said spectral parameter, whereby said background sound signal is generated by transmitting noise from a noise source controlled by said power value into said synthesizing filter.

6. A speech decoding apparatus according to claim 4, wherein said speech code signal is coded for successive frames and said speech code signal includes a spectral parameter, voiced/unvoiced sound information and thinned residual information for each of said successive frames.

7. A speech decoding apparatus according to claim 2, wherein said unvoiced sound information is stored in a parameter storing unit for successive frames of the decoded speech signal and is continually replaced in said parameter storing unit while said correcting and generating means does not generate said error indicating information.

8. A speech decoding apparatus according to claim 1, wherein said speech code signal comprises successive frames and sound information 9. A speech decoding apparatus for decoding a speech code signal and an error correcting code transmitted via a transmission medium, said speech code signal being coded for successive frames and said error correcting code being added to said speech code signal for each frame, comprising:
    receiving means for receiving a transmission code signal including said speech code signal and said error correcting code from said transmission medium;
    decoding means for detecting a code error corresponding to said error correcting code and for separating said speech code signal from said transmission code signal, said decoding means including means for correcting an erroneous code of said speech code signal in accordance with a predetermined rule and for generating error indicating information corresponding to each frame in which there is a code error which cannot be corrected;

speech decoding means for decoding said speech code signal which was separated in accordance with a predetermined process to generate a decoded speech signal;

parameter storing means for storing plural parameters corresponding to unvoiced sound information of said decoded speech signal, said parameter storing means including unvoiced sound detecting means for detecting said unvoiced sound information for each frame of said decoded speech signal, parameter extracting means for extracting plural characteristic parameters corresponding to said unvoiced sound information, and memory means for storing said plural characteristic parameters for successive frames, whereby said plural characteristic parameters are replaced continuously in said memory means;

background sound generating means for generating a background sound signal corresponding to said decoded speech signal, said background sound signal corresponding to said plural characteristic parameters; and switching controlling means for controlling said speech decoding means and said background sound generating means to selectively transmit either said decoded speech signal or said background sound signal in accordance with said error indicating information.

10. A speech coding apparatus according to claim 9, wherein a parameter of said plural characteristic parameters comprises a spectral parameter and a power value of said unvoiced sound information.

11. A speech coding apparatus according to claim 10, wherein said background sound generating means includes a synthesizing filter controlled by said spectral parameter, whereby said background sound signal is generated by generating a noise signal from a noise source controlled by said power value and transmitting said noise signal to said synthesizing filter.

12. A speech coding apparatus according to claim 10, wherein said speech decoding means includes a synthesizing filter and is controlled by said switching controlling means.

13. A speech coding and decoding system adapted for mobile radio communication which includes plural transmission line code errors, comprising:

a speech transmission unit for transmitting a speech signal which was received to a transmission medium, including speech inputting means for receiving said speech signal and an analog to digital converter for digitizing said speech signal to generate a digitized speech signal, speech coding means for coding said digitized speech signal to form a speech code signal, code forming means for adding an error correcting code to said speech code signal, and speech transmitting means for converting a signal including said speech code signal and said error correcting code into a transmission code signal of predetermined format and for transmitting said transmission code signal via a transmission medium; and a speech decoding unit for decoding said speech code signal transmitted via said transmission medium including receiving means for receiving said transmission code signal from said transmission medium, decoding means for detecting a code error corresponding to said error correcting code, for separating said speech code signal from said transmission code signal, for correcting an erroneous code of said speech code signal in accordance with a predetermined rule and for generating error indicating information indicating said erroneous code cannot be corrected, speech decoding means for decoding said speech code signal corresponding to a predetermined process to generate a decoded speech signal, background sound generating means for generating a background sound signal corresponding to background sound of said decoded speech signal, and switching controlling means for controlling said speech decoding means and said background sound generating means to select said decoded speech signal or said background sound signal in accordance with said error indicating information.

14. A speech coding and decoding system according to claim 13, wherein said background sound signal is generated from speech information including unvoiced sound information of said decoded speech signal.

15. A speech decoding apparatus according to claim 14, wherein said speech transmitting unit further comprises unvoiced sound detecting means for detecting unvoiced sound from said digitized speech signal and for generating a signal indicating said unvoiced sound to said code forming means.

16. A speech decoding apparatus according to claim 14, wherein said speech decoding unit further comprises unvoiced sound detecting means for detecting unvoiced sound information from said decoded speech signal.

17. A speech decoding apparatus according to claim 13, wherein said speech decoding unit further comprises parameter extracting means for extracting characteristic parameters corresponding to unvoiced sound information of said decoded speech signal, memory means for storing said plural characteristic parameters for successive frames, said plural characteristic parameters being continuously replaced, whereby said background sound signal is generated from said plural characteristic parameters.

18. A background sound reproducing method adapted for a system for decoding a speech code signal transmitted via a transmission medium and an error correcting code of a transmission code signal, said speech code signal being generated for successive frames and said error correcting code being added to said speech code signal for each frame, said method comprising the steps of:

detecting a code error in said transmission code signal corresponding to said error correcting code of said transmission code signal;

correcting an erroneous code of said transmission code signal corresponding to a predetermined rule if said erroneous code can be corrected;

generating error indicating information corresponding to said code error if said erroneous code cannot be corrected;

separating said speech code signal from said transmission code signal if said code error is not detected or if said erroneous code can be corrected;

decoding said speech code signal which was separated in accordance with a predetermined process to generate a decoded speech signal;

detecting an unvoiced sound signal of said decoded speech signal for said frame;

extracting plural characteristic parameters corresponding to said unvoiced sound signal and storing said plural characteristic parameters in a memory;

continuously replacing said plural characteristic parameters in said memory by plural characteristic parameters of a next frame in which either said code error was not detected or said erroneous code can be corrected and said unvoiced sound signal is detected; and generating a background sound signal corresponding to said decoded speech signal by reading said plural characteristic parameters which have been stored in said memory.

19. A background sound reproducing method according to claim 18, further including the step of replacing each frame which has said erroneous code that cannot be corrected with a frame having said background sound signal.

* * * * *